Jan. 17, 1950        H. W. KOST        2,494,881
FASTENING DEVICE FOR CONDENSERS OR THE LIKE
Filed July 3, 1945
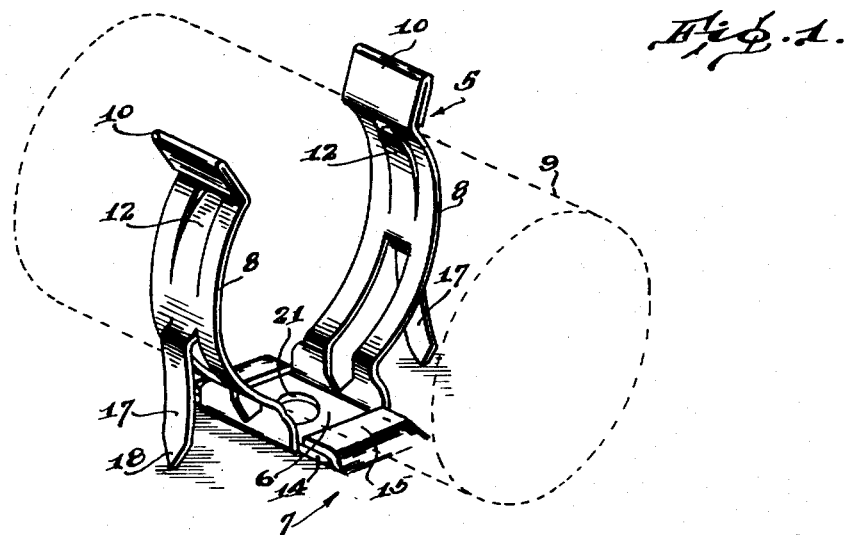
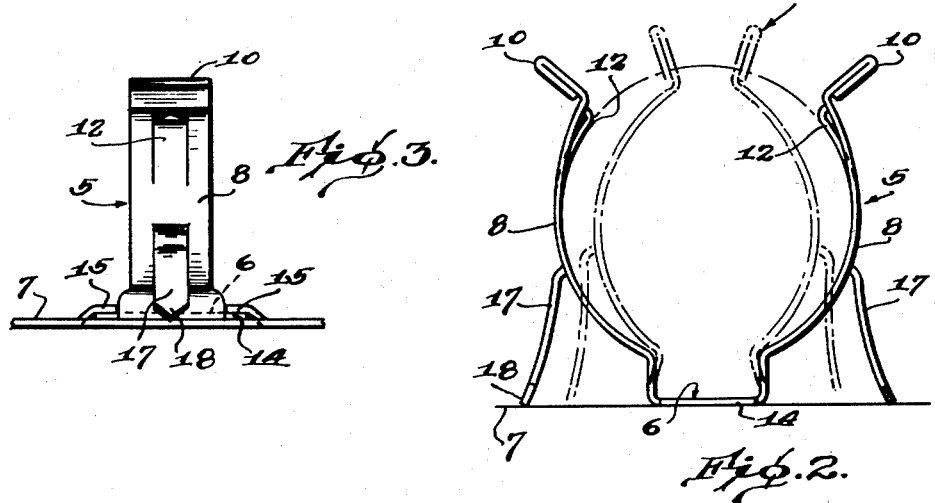
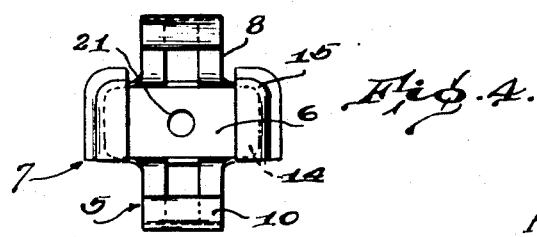
INVENTOR
Harold W. Kost
By Malcolm W. Pierce
ATTORNEY Patented Jan. 17, 1950

2,494,881

UNITED STATES PATENT OFFICE 2,494,881

FASTENING DEVICE FOR CONDENSERS OR THE LIKE

Harold W. Kost, Birmingham, Mich., assignor, by mesne assignments, to Prestole Corporation, Toledo, Ohio, a corporation of Michigan Application July 3, 1945, Serial No. 602,996

1 Claim. (Cl. 248—361)

The present invention relates to supporting means for cylindrical members and more particularly to a separable supporting band of novel construction for an electrical condenser, fuse or the like.

An object of the invention is to produce a novel condenser supporting clip adapted for removable attachment to a base member.

A further object of the invention is to produce a clip which is fixed automatically against removal from its support when an object is placed therein.

Other advantages and features of novelty will become apparent during the course of the following description when considered in connection with the accompanying drawings in which Figure 1 is a perspective view of a fastener embodying the present invention;

Figure 2 is an elevational view of the clip or fastener;

Figure 3 is a side elevational or edge view taken at a right angle to the showing on Figure 2; and Figure 4 is a plan view of the clip.

Generally, a device of the present type finds utility in radio and electrical or automotive arts where elements such as condensers, resistors or fuses are employed. Such elements may be readily removed and replaced as desired and the clip also removed. Provision may be made at various locations in the base member or supporting panel for receiving the clips so that selected positions may be used.

Referring now to the drawings, the illustrated embodiment of the invention comprises a substantially V-shaped member 5 having a flattened base portion 6 by which it is attached to a panel or other support 7. The fastener or clip 5 may be suitably formed of a thin relatively narrow strip of spring sheet metal and the upwardly extending resilient arms 8 are bent or arched outwardly partially to encircle a cylindrical object such as a fuse, condenser or resistor of the cartridge type, as indicated in broken lines at 9. The outer or free ends 10 of the arms 8 are bent or flared outwardly at an upwardly inclined angle and are folded back upon themselves to form reinforced finger pieces which are used when mounting the clip, as will hereinafter appear.

In order to insure firm supporting contact of the object held by the clip, each arm 8 is pierced throughout substantially the upper or outer half of its length to provide a leaf spring or finger 12. The spring fingers 12 are curved on the radius of the lower portion of the arms and below the spring which is a somewhat smaller radius than that of the outer portion of the arms 8 so that the outer ends of the springs lie inside the curve of the arm. In this manner the arms 8 due to the spring temper of the metal from which they are formed, exert pressure on the springs 12 inwardly.

The base portion 6 is provided on both sides with aligned laterally extending attaching flanges 14 projecting outwardly of the arms 8. The flanges are flat and rectangular in shape and are adapted frictionally to engage beneath ears 15 struck upwardly from the supporting panel 7. Thus the clip can be readily mounted or removed.

An important feature of the present invention resides in the means for securing the clip against displacement by vibration or other causes and also assure firm contact with the article held by the clip. To this end, I have provided a pair of fingers 17 struck from the inner or lower portions of the arms 8 and bent outwardly and downwardly in a direction substantially normal to the plane of the base 6. The ends of the fingers 17 are pointed as at 18 for positive impingement of the supporting panel when the clip is fixed in position. When the clip is removed from the support, the ends 18 of the fingers lie in a plane spaced slightly below the base portion 6. This is to insure a positive tension on the attaching members when the clip is in use.

In order to install the clip on the panel 7, the finger pieces 10 are grasped and brought together, as indicated by the broken lines 20 in Figure 2. This action causes the arms 8 to bend at the base 6 which raises the points of the fingers 17 above the plane of the base. In this position, the flanges 14 are readily slipped under the ears 15 of the support. When tension on the arms 8 is released, they move outwardly to a near normal position which movement is halted by the points 18 of the fingers 17 engaging the panel 7. Unreleased tension in the arms 8 tends to force the points firmly against the panel.

Formed in the base portion 6 is a screw or bolt receiving hole 21 for enabling the fastener to be mounted on a supporting panel which is not formed with ears 15.

Placing a fuse or condenser in the clip spreads the arms 8 apart and further increases the tension on the fingers 17. Thus outward pressure on the arms 8 by the article in the clip increases the tension on the fingers and the fingers in turn tend to press the arms and spring fingers 12 in contact with the article.

Modifications may be resorted to within the spirit of the invention and scope of the appended claim.

What I claim is:

Condenser mounting means comprising in combination a sheet metal support, a pair of laterally spaced ears struck from said support to lie in outwardly spaced parallel relation thereto, a sheet metal condenser holder having a base portion provided with a pair of aligned flanges extending from opposite sides thereof to engage respectively between said ears and said support member, a pair of resilient upwardly extending arms rigid with said base and shaped to conform to the condenser to be engaged therebetween, and fingers inclining outwardly and downwardly from said arms and the free ends of said fingers being adapted to impinging engagement with the support on opposite sides of said flanges for resisting spreading of said arms.

HAROLD W. KOST.

REFERENCES CITED

The following references are of record in the file of this patent:

UNITED STATES PATENTS

| Number | Name | Date |
| --- | --- | --- |
| 1,547,014 | Bantel | July 21, 1925 |
| 1,806,840 | Campbell | May 26, 1931 |
| 1,978,501 | Meyer | Oct. 30, 1934 |
| 1,981,973 | Tinnerman | Nov. 27, 1934 |
| 2,065,843 | Van Uum | Dec. 29, 1936 |
| 2,068,932 | Quarnstrom | Jan. 26, 1937 |
| 2,108,347 | Quarnstrom | Feb. 15, 1938 |
| 2,156,025 | Paul | Apr. 25, 1939 |

FOREIGN PATENTS

| Number | Country | Date |
| --- | --- | --- |
| 693,497 | France | Aug. 25, 1930 |
| 81,714 | Sweden | Aug. 16, 1934 |